United States Patent
Osada et al.

(10) Patent No.: US 6,276,065 B1
(45) Date of Patent: Aug. 21, 2001

(54) BLADE ATTACHING AND DETACHING MECHANISM FOR A SABER SAW

(75) Inventors: Yoshio Osada, Hitachinaka; Toshihiko Tachibana, Hitachi, both of (JP)

(73) Assignee: Hitachi Koki Co., Ltd., Tokyo (JP)

(*) Notice: Subject to any disclaimer, the term of this patent is extended or adjusted under 35 U.S.C. 154(b) by 0 days.

(21) Appl. No.: 09/426,646

(22) Filed: Oct. 25, 1999

(30) Foreign Application Priority Data

Oct. 23, 1998 (JP) .................................................. 10-301923
Aug. 30, 1999 (JP) .................................................. 11-242508

(51) Int. Cl.[7] .................................................... B27B 19/09
(52) U.S. Cl. ........................................... 30/392; 279/904
(58) Field of Search ........................ 32/392–394; 279/97, 279/904, 905

(56) References Cited

U.S. PATENT DOCUMENTS

| 3,927,893 | 12/1975 | Dillon et al. ..................... 30/392 X |
| 4,299,402 | 11/1981 | Hoffman . | |
| 5,219,174 | * 6/1993 | Zurbrugg et al. ................ 279/904 X |
| 5,443,276 | 8/1995 | Nasser et al. . | |
| 5,575,071 | 11/1996 | Phillips et al. . | |
| 5,647,133 | 7/1997 | Dassoulas . | |
| 5,903,983 | * 5/1999 | Jungmann et al. ..................... 30/392 |
| 6,209,208 | 4/2001 | Marinkovich et al. ................. 30/392 |

FOREIGN PATENT DOCUMENTS

| 12-117534 | 4/2000 | (JP) . |
| 13-500795 | 1/2001 | (JP) . |

* cited by examiner

*Primary Examiner*—Douglas D. Watts
(74) *Attorney, Agent, or Firm*—Connolly Bove Lodge & Hutz LLP

(57) ABSTRACT

A blade is inserted into a slit which extends in an axial direction of a plunger. A bore extends in a direction normal to the axial direction of the plunger and merges with the slit. A locking pin is slidably disposed in the bore. A blade holder is coupled around the plunger and slidable in the axial direction of the plunger. The blade holder shifts in an axially forward direction to generate a pushing force applied to the locking pin. The locking pin engages with a hole of the blade. Furthermore, the blade holder shifts in an axially rearward direction to release the pushing force applied to the locking pin. The locking pin disengages from the hole of the blade.

17 Claims, 9 Drawing Sheets

BLADE ATTACHING AND DETACHING MECHANISM FOR A SABER SAW

BACKGROUND OF THE INVENTION

The present invention relates to a blade attaching and detaching mechanism for saber saws. Various saber saws have been conventionally developed to cut or saw woody or steel materials or pipes in the housing or building construction sites or similar fields.

The saber saw is a cutting tool with a reciprocating plunger driven by an electric motor. A blade has an engaging hole engageable with the plunger.

The normal size plungers have a reciprocating stroke of approximately 20 mm to 32 mm. In actual cutting or sawing operations, the blade is locally worn at the limited region corresponding to the reciprocating stroke. Especially, blades are frequently broken during the cutting operation of a steel member. A long blade tends to be broken at its proximal end closer to the plunger. In many cases, the blades are broken and the user is forced to exchange the blades frequently.

To exchange the blades, using a wrench or a specialized tool is popular. However, using the wrench or specialized tool is inefficient because it takes a long time to complete the attaching or detaching operation. Moreover, the user may lose the wrench or specialized tool.

U.S. Pat. Nos. 5,443,276; 5,575,071; 5,647,133; and 4,299,402 disclose toolless blade attaching and detaching mechanisms capable of exchanging the blades without using a wrench or similar tool.

For example, U.S. Pat. Nos. 5,443,276; 5,575,071; and 5,647,133 disclose the toolless blade attaching and detaching mechanisms having a steel ball or a movable locking pin which is engageable with a hole of the blade. A lever or a rotary ring is provided to hold the attached blade or to disengage the steel ball or the movable locking pin from the blade.

However, these conventional toolless blade attaching and detaching mechanisms basically force the use to touch the blade for removing the blade or its broken piece. During the removing operation, the sharp edge of the blade may injure the user's hand. The blade surface has a high temperature due to friction during the cutting or sawing operation. The user's hand may be burned by the heated blade surface.

When the blade is broken at the proximal end, a small piece of the blade will be left in a narrow space of the plunger. It takes a long time to completely remove such a small piece remaining in the narrow space of the plunger.

According to the toolless blade attaching and detaching mechanisms disclosed in U.S. Pat. Nos. 5,443,276 and 5,575,071, the user is required to hold the lever or the rotary ring at a predetermined unlock position of the locking pin against the resilient force during the blade attaching and detaching operation. In other words, the user must use both hands simultaneously.

Furthermore, the blade has an elongated shape and therefore easily causes a lateral vibration when it reciprocates at a high speed.

The toolless blade attaching and detaching mechanisms disclosed in U.S. Pat. Nos. 5,443,276 and 5,647,133 comprise complicated parts exposed outside the saber saw. This is disadvantageous in that such complicated parts may be damaged by a cut or sawed member during the cutting or sawing operation.

Furthermore, according to the toolless blade attaching and detaching mechanism disclosed in U.S. Pat. No. 4,299,402, it is difficult to press a side surface of the blade. The blade will be subjected to a severe vibration.

SUMMARY OF THE INVENTION

An object of the present invention is to provide a blade attaching and detaching mechanism for a saber saw which is durable and is capable of simply, safely and surely fixing and removing the blade to or from the plunger.

In order to accomplish this and other related objects, the present invention provides a blade attaching and detaching mechanism for a saber saw comprising a plunger for holding a rear end of a blade and reciprocating the blade to perform a cutting or sawing operation. A slit and a bore are formed in the plunger. The slit extends in an axial direction of the plunger. The bore extends in a direction normal to the axial direction of the plunger. The slit and the bore merge with each other. A locking pin is slidably disposed in the bore. The locking pin comprises a projecting portion engageable with a hole formed on the blade, and a surface for pressing a side surface of the blade to a wall of the slit of the plunger. A blade holder is coupled around the plunger and slidable in the axial direction of the plunger. The blade holder shifts in an axially forward direction to generate a pushing force applied to the locking pin. With this pushing force, the locking pin engages with the hole of the blade. Furthermore, the blade holder shifts in an axially rearward direction to release the pushing force applied to the locking pin. The locking pin is disengaged from the hole of the blade.

Preferably, an additional blade holder is provided for slidably holding the blade holder. The additional blade holder prevents the locking pin from being pulled out of the bore when the blade holder shifts in the axially rearward direction.

Preferably, the blade holder has a tapered cylindrical surface expanding in the axially forward direction. The tapered cylindrical surface is brought into contact with the locking pin so as to regulate a shifting position of the locking pin. A contact point between the tapered cylindrical surface and the locking pin changes in accordance with an axial movement of the blade holder. Thus, the pushing force applied to the locking pin is changeable.

Preferably, a resilient member is provided for resiliently urging the blade holder in the axially forward direction.

Preferably, a helical groove is provided on an outer surface of the plunger. The helical groove has a predetermined inclined angle with respect to an axis of the plunger. An engaging member is disposed in the helical groove. The engaging member, such as a steel ball, rolls in the helical groove when the blade holder rotates. Thus, the blade holder is allowed to shift in the axial direction of the plunger.

Preferably, an additional groove is continuously formed with the helical groove. The additional groove is arranged perpendicular to the axis of the plunger.

Preferably, an urging member is provided in the bore of the plunger so as to urge the locking pin in a radially outward direction.

Preferably, a support member is interposed between the resilient member and the plunger.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

Figure 1:
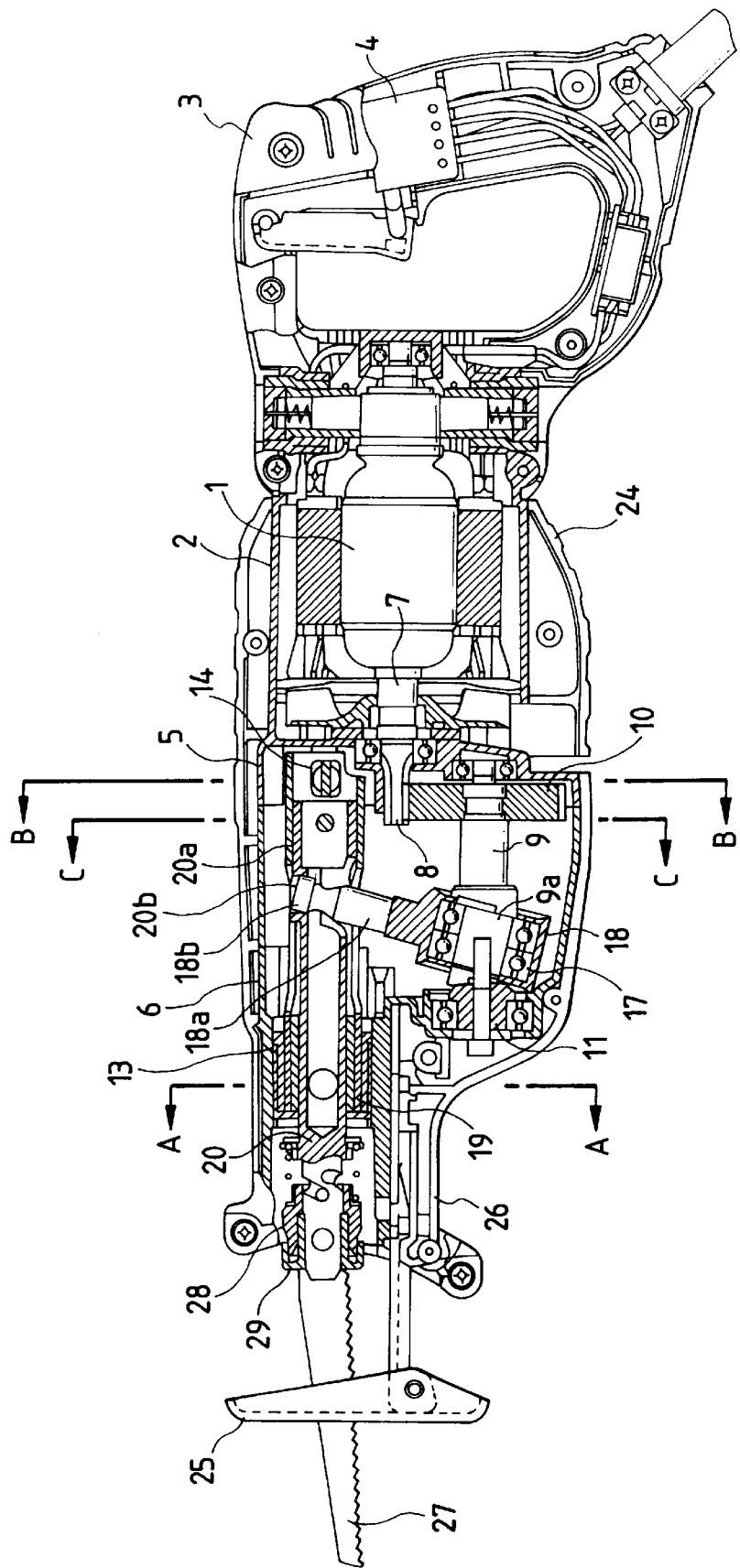
FIG. 1 is a partly cross-sectional side view showing a saber saw employing a blade attaching and detaching mechanism in accordance with a preferred embodiment of the present invention.

A preferred embodiment of the present invention will be explained with reference to FIGS. 1 to 23. Identical parts are denoted by the same reference numerals throughout the views. The directions used in the following explanation are defined based on a saber saw held in a horizontal position with a longitudinal axis extending in a horizontal direction.

Motor Section

An electrically driven motor 1 is accommodated in a resin housing 2. A handle 3 is connected to the rear end of the housing 2. The handle 3 is equipped with a switch 4 which on-and-off controls the power supply to the electric motor

Speed-reducing Mechanism

An inner cover 5 and a gear cover 6, each being an aluminum product, are connected to the front end of the housing 2 for accommodating a driving force transmitting mechanism. The electric motor 1 has a motor shaft 7 serving as a rotary member outputting a rotational driving force of the electric motor 1. A driving gear 8 is formed at the front end of the motor shaft 7. A second shaft 9 is positioned in parallel to the motor shaft 7. A driven gear 10 is attached on the second haft 9 so as to mesh with the driving gear 8. The driving gear 8 and the driven gear 10 cooperate as a speed reducing mechanism. The rotation of the electric motor 1 is transmitted to the second shaft 9 via the speed reducing mechanism. Thus, the second shaft 9 rotates at a reduced speed. A slant shaft 9a is formed at the front end of the second shaft 9. The inclination of the slant shaft 9a with respect to the second shaft 9 is approximately 14°. A sub shaft 11 is attached to the front end of the slant shaft 9a. The sub shaft 11 is coaxial with the second shaft 9.

Reciprocating Shaft Holding Structure

Figure 2:
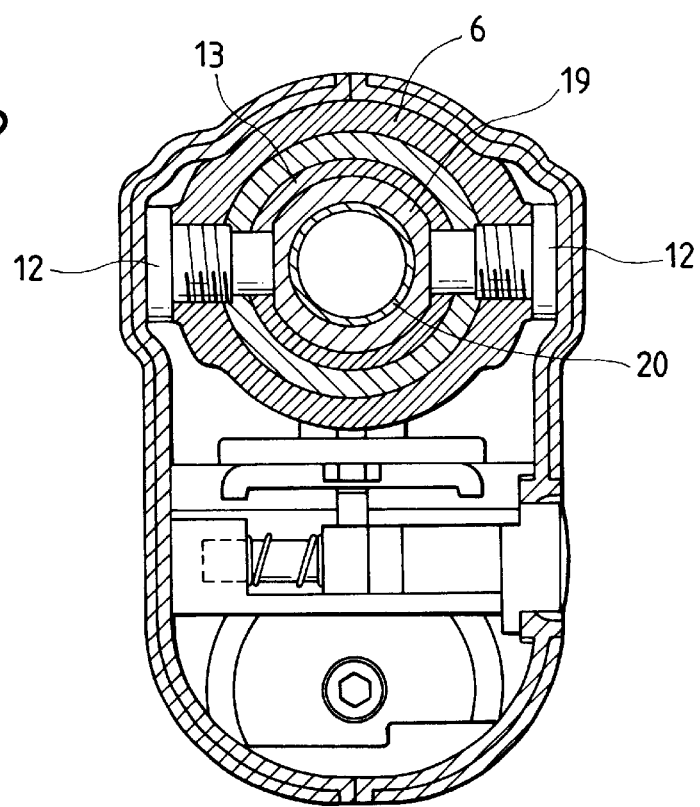
FIG. 2 is a vertical cross-sectional view taken along a line A—A shown in FIG. 1.
Figure 3:
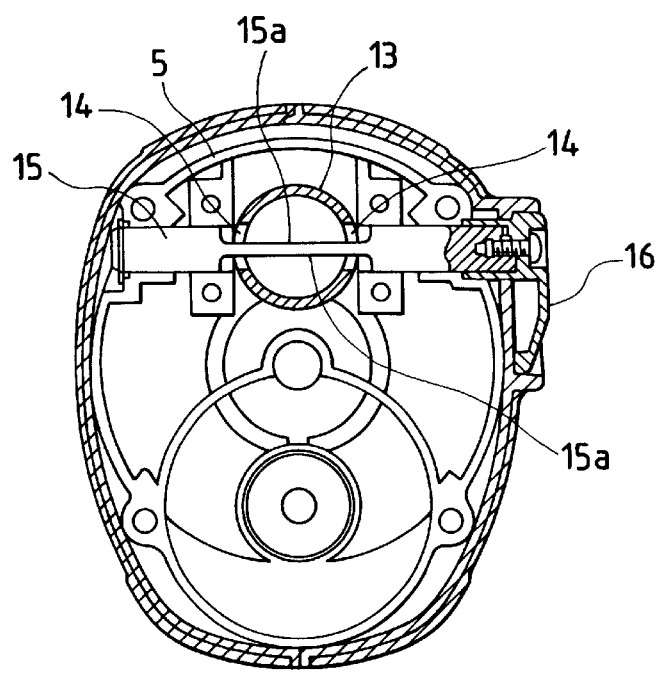
FIG. 3 is a vertical cross-sectional view taken along a line B—B shown in FIG. 1.

As shown in FIG. 2, two axle bolts 12 are opposed and coaxially attached to the front end of the gear cover 6. A guide sleeve 13 is supported at the inner ends of the axle bolts 12 and rotatable about the common axis of the axle bolts 12. Two opposed rectangular through holes 14 are formed at the rear end of the guide sleeve 13 as shown in FIGS. 1 and 3. A change shaft 15 is rotatably installed on the inside wall of the inner cover 5. The change shaft 15 is inserted into the rectangular through holes 14. The change shaft 15 has two symmetric flat surfaces 15a formed at opposite sides of the central region thereof. The flat surfaces 15a extend in a wider region larger than the diameter of the guide sleeve 13. A change lever 16 is securely connected to the axial end of the change shaft 15. The change shaft 15 rotates in accordance with a turning operation of the change lever 16. The rotation of the change shaft 15 selectively allows or restricts the rotation of the guide sleeve 13.

Rotation-Reciprocation Converting Mechanism

A reciprocative plate 18 has a sleevelike base portion coupled around the slant shaft 9a via two bearing rings 17. The reciprocative plate 18 has a swing shaft 18a integrally extending from the sleevelike base portion in the radial direction. A ball portion 18b is formed at the distal end of the swing shaft 18a. A cylindrical bearing metal 19 is press fitted into the front end portion of the cylindrical guide sleeve 13. A plunger 20 reciprocates along the cylindrical inner wall of the bearing metal 19. The plunger 20 has a larger-diameter portion 20a at the rear end thereof. A slight clearance is provided between the larger-diameter portion 20a and the cylindrical inner wall of the guide sleeve 13. The swing shaft 18a of the reciprocative plate 18 is inserted into upper and lower openings formed on the larger-diameter portion 20a of the plunger 20. An upper opening 20b of the larger-diameter portion 20a is loosely coupled with the ball portion 18b of the swing shaft 18a. The ball portion 18b can roll along the cylindrical edge of the upper opening 20b. The lower opening of the larger-diameter portion 20a is widely opened so that the swing movement of the swing shaft 18a is not blocked by the lower opening of the larger-diameter portion 20a. With the above-described arrangement the rotational motion of the second shaft 9 is converted into a reciprocative motion of the plunger 20.

Swing Sawing Mechanism

Figure 4:
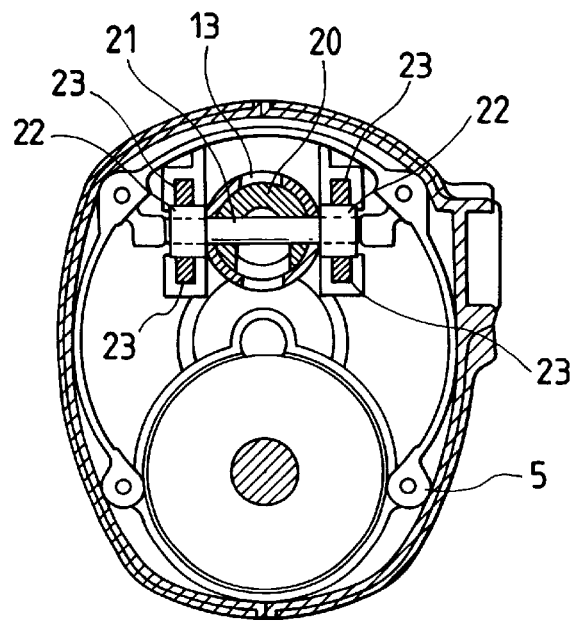
FIG. 4 is a vertical cross-sectional view taken along a line C—C shown in FIG. 1.
Figure 5:
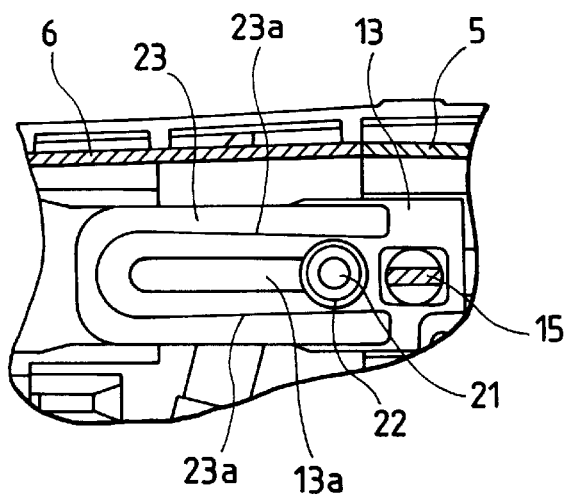
FIG. 5 is a party cross-sectional side view showing a swing sawing mechanism shown in FIG. 1.

A roller shaft 21 is inserted into an elongated hole 13a formed on the guide sleeve 13 so as to penetrate the guide sleeve 13 and the plunger 20, as shown in FIGS. 4 and 5. Both ends of the roller shaft 21 are supported by swing rollers 22. Each swing roller 22 is rotatable along a corresponding swing rail 23. Each swing rail 23 has an inclined surface 23a extending in the axial direction of the plunger 20 so as to guide the upper and lower edges of the swing roller 22. Each swing rail 23 is securely fixed to the inner cover 5 and the gear cover 6. When the change shaft 15 is set in a release position shown in FIG. 1 or 5, each swing roller 22 rolls along the inclined surface 23a of the corresponding swing rail 23. With this arrangement, plunger 20 can reciprocate and swing simultaneously.

Front Holding Structure

A resin front cover 24 covers all of the inner cover 5 and the gear cover 6 and also partly accommodates the housing 2. A base 25 is installed on the front end of the gear cover 6 via a fixing lever 26. The base 25 stabilizes the position of the saber saw with respect to a material to be cut by the saber saw.

Blade Attaching and Detaching Mechanism

Figure 6:
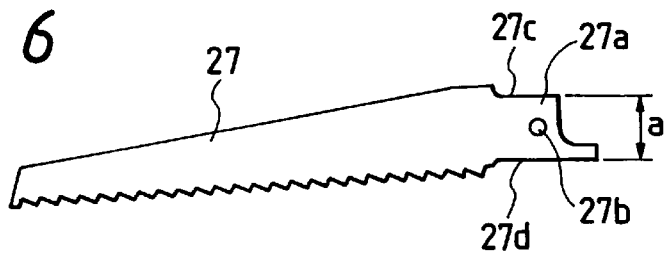
FIG. 6 is a side view showing a blade to be attached or detached by the attaching and detaching mechanism of the present invention.

FIG. 6 shows a general blade 27. An engaging hole 27b is provided at a proximal end 27a of the blade 27.

Figure 7:
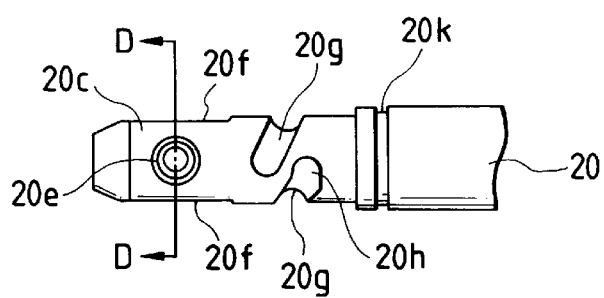
FIG. 7 is a side view showing a front end of a plunger employed in the attaching and detaching mechanism of the present invention.
Figure 8:
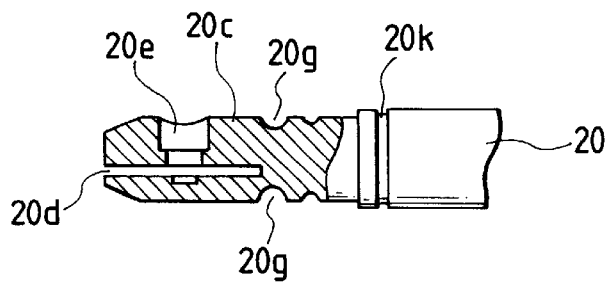
FIG. 8 is a partly cross-sectional plan view showing the front end of the plunger shown in FIG. 7.
Figure 9:
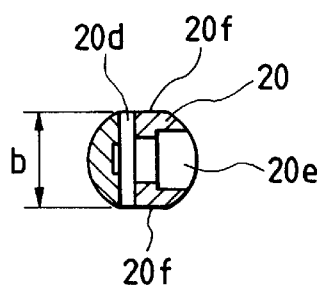
FIG. 9 is a cross-sectional view taken along a line D—D shown in FIG. 7.

FIGS. 7 and 8 show a blade attaching portion 20c formed at the front end of the plunger 20. The blade attaching portion 20c comprises a slit 20d into which the blade 27 is inserted. The blade attaching portion 20c further comprises a stepped bore 20e which is perpendicular to the side surface of the blade 27 and coaxial with the engaging hole 27b of the blade 27 when the blade 27 is attached to the blade attaching portion 20c. The stepped bore 20e extends in the radial direction of the blade attaching portion 20c from the outer surface of the blade attaching portion 20c so as to cross the slit 20d. Upper and lower flat surfaces 20f are parallel with the axis of the plunger 20 and formed at opposite sides of the blade attaching portion 20c. The clearance "b" between the upper and lower flat surfaces 20f is slightly smaller than a width "a" of the proximal end 27a of the blade 27.

Figure 10:
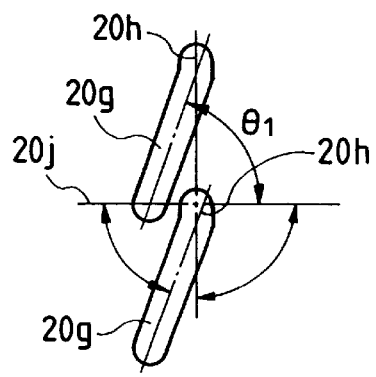
FIG. 10 is an expansion plan view showing helical grooves formed on the cylindrical surface of the plunger shown in FIG. 7.

Two helical grooves 20g are symmetrical with respect to the axis of plunger 20 and are formed on the outer surface of the blade attaching portion 20c. A perpendicularly arranged groove 20h is continuously formed at the rear end of each helical groove 20g. The perpendicularly arranged groove 20h is substantially normal to the axis of the plunger 20. FIG. 10 is an expansion plan view showing the helical grooves 20g, in which θ1 represents the inclined angle of the helical groove 20g with respect to the axis 20j of the plunger 20. Furthermore, the blade attaching portion 20c has a normal groove 20k into which a stopper ring is coupled.

Figure 11:
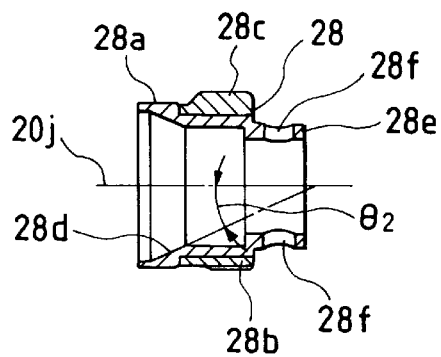
FIG. 11 is a cross-sectional side view showing a first blade holder used in the blade attaching and detaching mechanism in accordance with the preferred embodiment of the present invention.

FIG. 11 shows a first blade holder 28 which is axially shiftable when the blade 27 is attached or detached to the plunger 20. The first blade holder 28 comprises an inner sleeve 28a made of a high-strength material such as a steel plate. An outer sleeve 28b is coupled around the inner sleeve 28a. The outer sleeve 28b serves as an operating grip portion and is made of a plastic or similar member which has a small value in the coefficient of thermal conductivity.

The first blade holder 28 is configured into a cylindrical shape which is advantageous in the strength. A plurality of projections 28c are formed along an outer surface of the outer sleeve 28b so that a user can easily grip the outer sleeve 28b. A tapered cylindrical surface 28d is formed at the front end of the inner sleeve 28a. The tapered cylindrical surface 28d forms a conical inner surface of the inner sleeve 28a which expands in the forward direction. In FIG. 11, θ2 represents the inclined angle of the tapered cylindrical surface 28d with respect to the axis 20j of the plunger 20. A cylindrical portion 28e constitutes the rear end of the inner sleeve 28a. The cylindrical portion 28e has two holes 28f into which steel balls are disposed.

Figure 12:
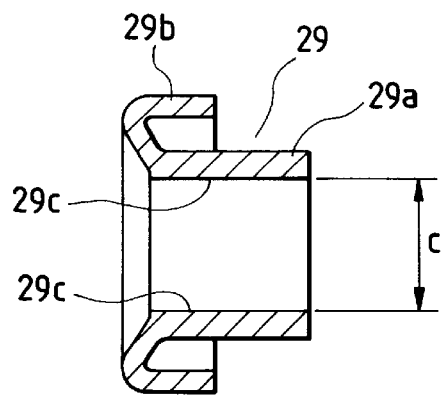
FIG. 12 is a cross-sectional side view showing a second blade holder used in the blade attaching and detaching mechanism in accordance with the preferred embodiment of the present invention.
Figure 13:
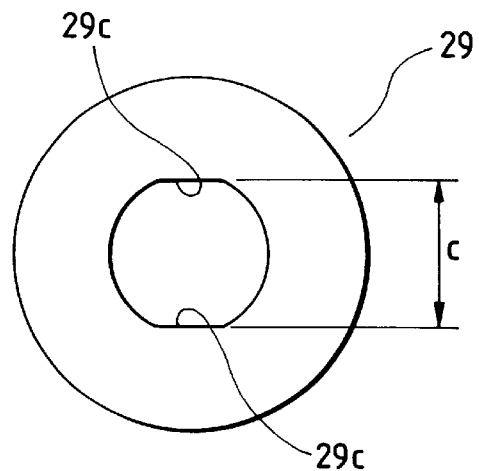
FIG. 13 is a left side view of the second blade holder shown in FIG. 12.
Figure 14:
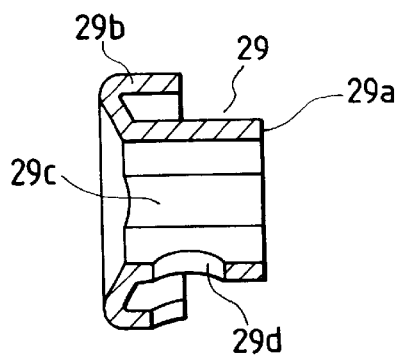
FIG. 14 is a cross-sectional plan view showing the second blade holder shown in FIG. 12.

FIGS. 12 to 14 show a second blade holder 29 which receives the cutting load acting in the up-and-down direction of the blade 27. The second blade holder 29 is made of a high-strength material such as a steel plate. Like the first blade holder 28, the second blade holder 29 is configured into a cylindrical shape which is advantageous in the strength. The second blade holder 29 and the first blade holder 28 cooperatively prevent a later-described locking pin from being pulled out of the stepped bore 20e when the first blade holder 28 shifts in the axially rearward direction. The second blade holder 29 consists of an inner cylindrical portion 29a and an outer cylindrical portion 29b. The inner cylindrical portion 29a has an inner diameter slightly larger than the outer diameter of the blade attaching portion 20c of the blade 20.

As shown in FIG. 13, the second blade holder 29 has two flat surfaces 29c which are parallel with each other and spaced by a clearance "c" slightly larger than the width "a" of the proximal end 27a of the blade 27. The inner cylindrical portion 29a has an opening 29d provided on the cylindrical wall thereof, as shown in FIG. 14. The outer cylindrical portion 29b is positioned most closely to the material to be cut. The outer cylindrical portion 29b surrounds the front edge of the tapered cylindrical surface 28d of the first blade holder 28. Thus, the outer cylindrical portion 29b protects the blade attaching and detaching mechanism from the cut or sawed material.

Figure 15:
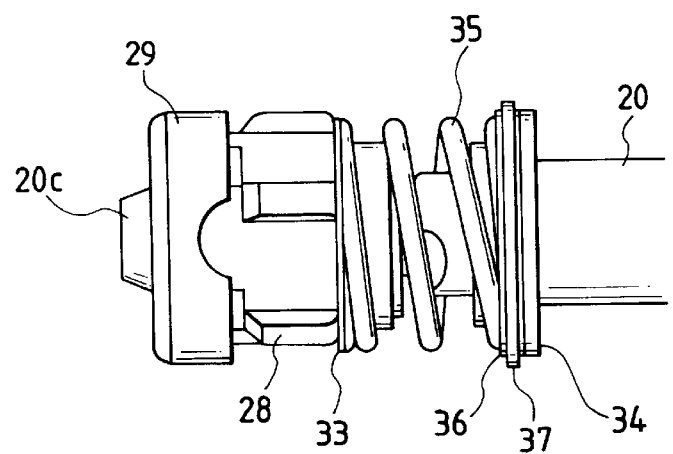
FIG. 15 is a side view showing an essential arrangement of the blade attaching and detaching mechanism in accordance with the preferred embodiment of the present invention.
Figure 16:
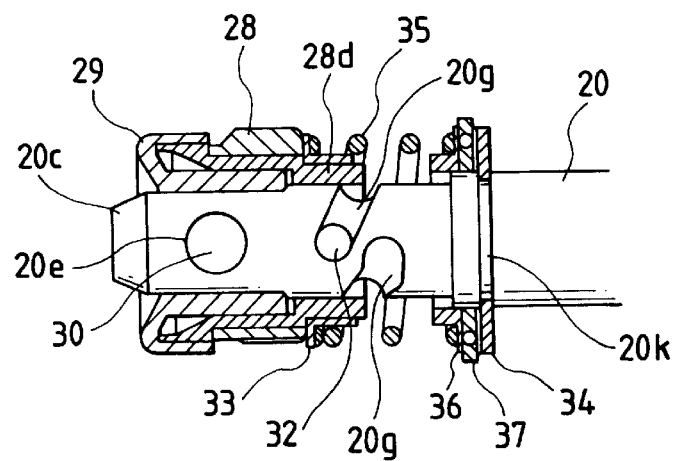
FIG. 16 is a cross-sectional side view showing the essential arrangement of the blade attaching and detaching mechanism shown in FIG. 15.
Figure 17:
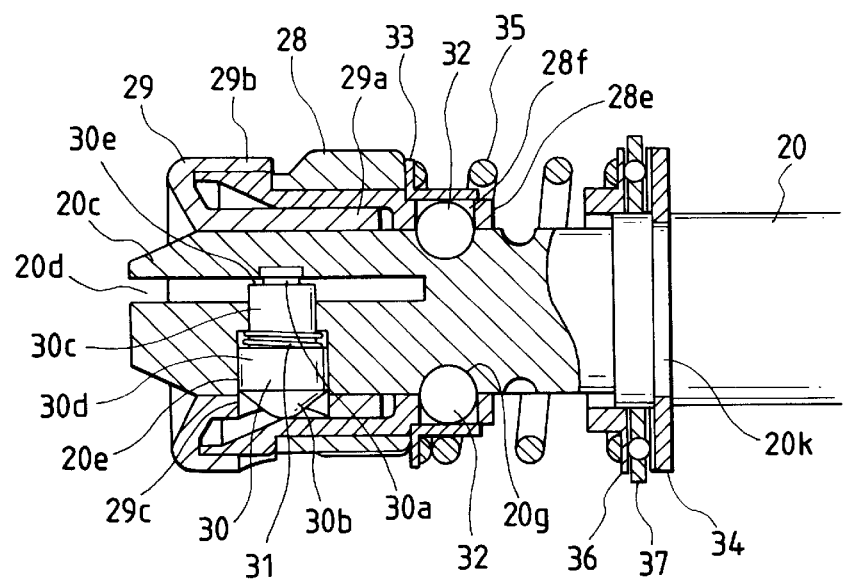
FIG. 17 is an enlarged cross-sectional plan view showing the essential arrangement of the blade attaching and detaching mechanism shown in FIG. 15.

FIGS. 15 to 17 show a blade detached condition of the blade attaching and detaching mechanism in accordance with the present invention. A blade locking pin 30 is inserted into the stepped bore 20e of the plunger 20 and the opening 29d of the second blade holder 29. The blade locking pin 30 is shiftable in a radial direction normal to the axis of the plunger 20. The blade locking pin 30 restricts both the rotation and the axial shift movement of the second blade holder 29 with respect to the plunger 20.

The blade locking pin 30 comprises a first columnar portion 30a formed at its distal end. The first columnar portion 30a penetrates the engaging hole 27b of the blade 27 to prevent the blade 27 from being pulled out. A second columnar portion 30c is integrally formed with the first columnar portion 30a. The diameter of the second columnar portion 30c is larger than the diameter of the first columnar portion 30a. The second columnar portion 30c has an engaging surface 30e for pressing and holding the side surface of the proximal end 27a of the blade 27 to the wall of the slit 20d of the plunger 20. A third columnar portion 30*d* is integrally formed with the second columnar portion 30*c*. The diameter of the third columnar portion 30*d* is larger than the diameter of the second columnar portion 30*c*. A conical projection 30*b* is formed at an opposite end of the third columnar portion 30*d*. The conical projection 30*b* is brought into contact, at a point, with the tapered cylindrical surface 28*d* of the inner sleeve 28*a* of the first blade holder 28. A compression spring 31 is disposed in a space between the third columnar portion 30*d* of the blade locking pin 30 and the stepped bore 20*e* of the plunger 20. The compression spring 31 continuously urges the blade locking pin 30 in a radially outward direction. When the blade attaching and detaching mechanism is in a released condition, the blade locking pin 30 is automatically pulled out of the engaging hole 27*b* of the blade 27.

The first blade holder 28 is slightly spaced from each of the outer cylindrical surface of the inner cylindrical portion 29*a* of the second blade holder 29, the inner cylindrical surface of the outer cylindrical portion 29*b*, and an outer cylindrical surface of the blade attaching portion 20*c* of the plunger 20. A steel ball 32 is disposed in each steel ball hole 28*f* and the corresponding helical groove 20*g* of the plunger 20. The steel ball 32 can roll in the helical groove 20*g*. When the first blade holder 28 is rotated by the user, the steel ball 32 rolls along the helical groove 20*g*. Thus, the first blade holder 28 can slide in the axial direction of the plunger 20, while the first blade holder 28 is guided by the rolling motion of the steel ball 32. A flange washer 33 is provided around the cylindrical portion 28*e* of the first blade holder 28. The flange washer 33 prevents the steel balls 32 from falling out of the first blade holder 28.

A stopper ring 34 is coupled in the normal groove 20*k* of the plunger 20. A compression spring 35 is disposed between the first blade holder 28 and the stopper ring 34. The compression spring 35 presses the first blade holder 28 toward the second blade holder 29. The tapered cylindrical surface 28*d* of the first blade holder 28 pushes the blade locking pin 30 in the radially inward direction to press the blade 27. A flange washer 36 and a thrust bearing 37 are interposed between the stopper ring 34 and the compression spring 35. By the provision of the flange washer 36 and the thrust bearing 37, the first blade holder 28 and the compression spring 35 rotate together smoothly.

FIG. 17 shows the blade locking pin 30 with the first columnar portion 30*a* protruding into the slit 20*d* of the plunger 20. In this condition, the blade 27 cannot be fully inserted into the slit 20*d*. Hereinafter, the attaching and detaching operation of the blade 27 will be explained.

Attachment of Blade 27

Figure 18:
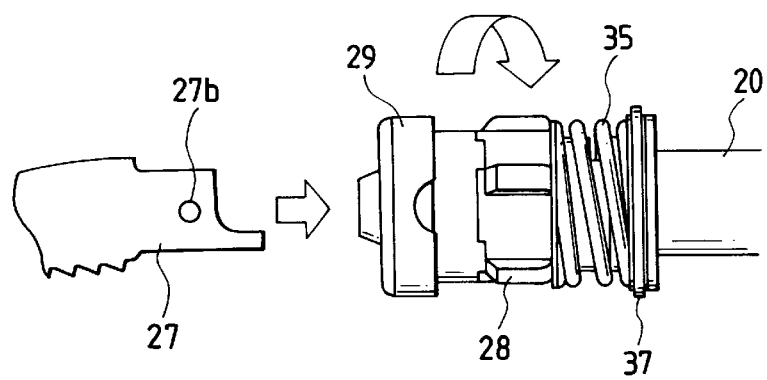
FIG. 18 is a side view showing a blade attaching operation of the blade attaching and detaching mechanism in accordance with the preferred embodiment of the present invention.
Figure 19:
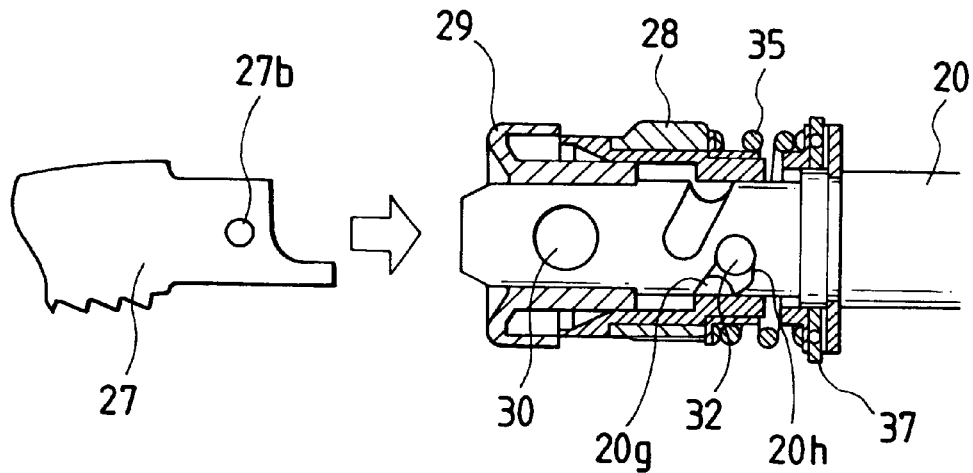
FIG. 19 is a cross-sectional side view showing the blade attaching and detaching mechanism shown in FIG. 18.
Figure 20:
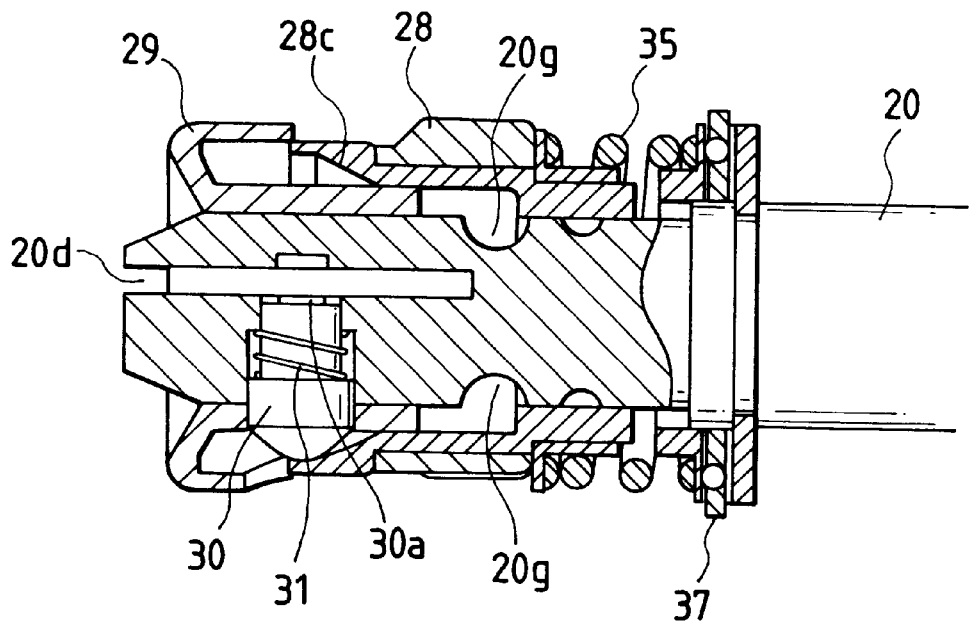
FIG. 20 is an enlarged cross-sectional plan view showing the blade attaching and detaching mechanism shown in FIG. 18.

FIGS. 18 to 20 show the attachment of the blade 27. The first blade holder 28 is rotated in the arrow direction. The steel ball 32 rolls in the helical groove 20*g* of the plunger 20, while the first blade holder 28 retracts in the axially rearward direction against the resilient force of the compression spring 35. The tapered cylindrical surface 28*d* of the first blade holder 28 regulates the radial position of the blade locking pin 30 which is resiliently urged by the compression spring 31. When the first blade holder 28 retracts in the axially rearward direction, the radial position of the blade locking pin 30 varies in accordance with the change of the contact point between the conical projection 30*b* of the blade locking pin 30 and the tapered cylindrical surface 28*d* of the first blade holder 28. The blade locking pin 30 is thus allowed to move in the radially outward direction along the slope defined by the tapered cylindrical surface 28*d* of the first blade holder 28, as shown in FIG. 20.

In other words, the blade locking pin 30 completely exits out of the slit 20*d* of the plunger 20. The blade 27 can be fully inserted into the slit 20*d* in this condition.

When the first blade holder 28 is completely rotated in the arrow direction, the steel ball 32 rolls into the perpendicularly arranged groove 20*h* from the helical groove 20*g*. When the steel ball 32 is placed in the perpendicularly arranged groove 20*h*, the first blade holder 28 is locked in a blade attachable condition. This allows the user to easily insert the blade 27 deeply into the slit 20*d* by one hand.

Fixing of Blade 27

Figure 21:
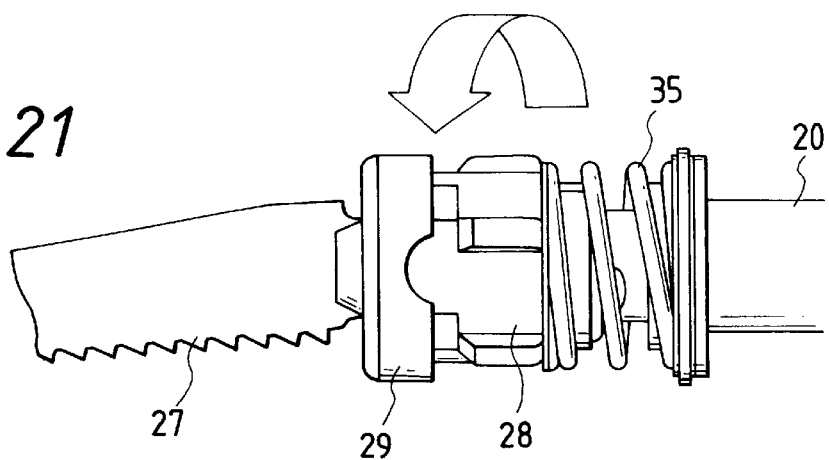
FIG. 21 is a side view showing a blade fixing operation of the blade attaching and detaching mechanism in accordance with the preferred embodiment of the present invention.
Figure 22:
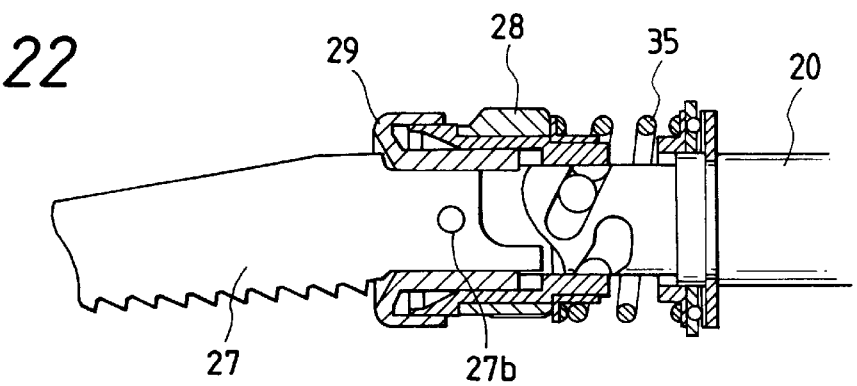
FIG. 22 is a cross-sectional side view showing the blade attaching and detaching mechanism shown in FIG. 21.
Figure 23:
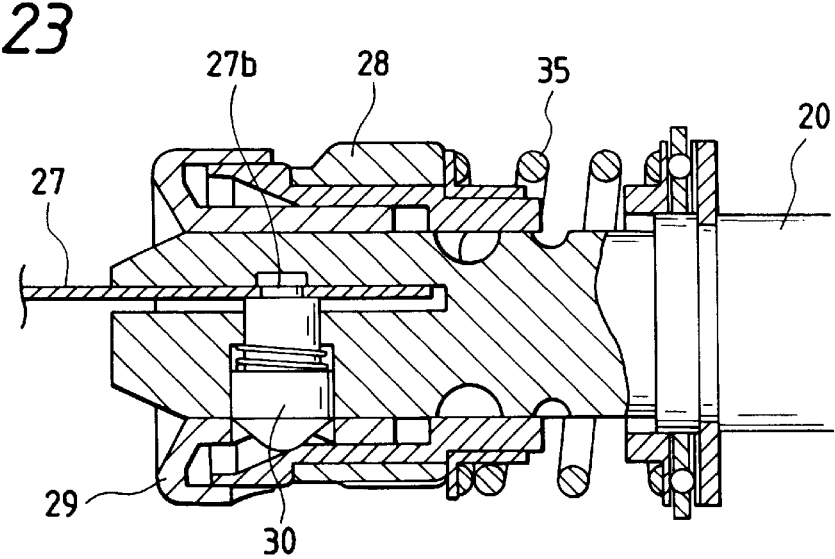
FIG. 23 is an enlarged cross-sectional plan view showing the blade attaching and detaching mechanism shown in FIG. 21.

In the condition shown in FIG. 20, the blade 27 is inserted into the slit 20*d* of the plunger 20. Then, the user rotates the first blade holder 28 in the opposite direction as shown in FIG. 21. Fixing of the blade 27 is automatically performed during this reverse rotation of the first blade holder 28. The steel ball 32 returns from the perpendicularly arranged groove 20*h* to the helical groove 20*g*. By the resilient force of the compression spring 35, the first blade holder 28 shifts forward. In accordance with the forward shift motion of the first blade holder 28, the tapered cylindrical surface 28*d* of the first blade holder 28 depresses the blade locking pin 30 in the radially inward direction. Thus, the first columnar portion 30*a* of the blade locking pin 30 is inserted into the engaging hole 27*b* of the blade 27. Then, the engaging surface 30*e* of the second columnar portion 30*c* presses and securely holds the side surface of the proximal end 27*a* of the blade 27 to the wall of the slit 20*d* of the plunger 20. Thus, the blade 27 can be securely fixed to the plunger 20 as shown in FIG. 23. The compression spring 31 compresses in response to a radial force acting from the tapered cylindrical surface 28*d* of the first blade holder 28. In other words, the tapered cylindrical surface 28*d* converts the axial shift motion of the first blade holder 28 into the radial force acting on the compression spring 31. The resilient force of the compression spring 31 is only required to shift the blade locking pin 30 which is relatively small and light. Therefore, the resilient force of the compression spring 31 is fairly smaller compared with that of the compression spring 35.

Detachment of Blade 27

To detach the blade 27, the user rotates the first blade holder 28 in the arrow direction shown in FIG. 18 in the same manner as the attaching operation of the blade 27. The blade locking pin 30 is automatically disengaged from the engaging hole 27*b* of the blade 27 in accordance with the shift motion of the first blade holder 28 which retracts in the axial direction. Thus, the blade 27 can be easily detached.

Strength of Compression Spring 35

In determining the strength (load) of the compression spring 35, the following three conditions should be satisfied.

① The plunger 20 reciprocates at a higher speed during a cutting or sawing operation. In response to the high-speed reciprocative movement of the plunger 20, the first blade holder 28 will be forced to shift rearward (i.e., retract) against the resilient force of the compression spring 35. Thus, it is desirable that the strength (load) of the compression spring 35 is sufficiently large to block the retracting movement of the first blade holder 28.

② The blade 27 causes a lateral vibration when it reciprocates at a higher speed. To suppress this vibratory motion, it is desirable to apply a pressing force F1 to the side surface of the proximal end 27*a* of the blade 27 via the blade locking pin 30 when the blade 27 is placed in the slit 20*d* of the plunger 20. The pressing force F1 is defined by the following equation.

$$F1 = W1(1 - \mu 1 \tan \theta 2)/(\mu 1 + \tan \theta 2) \qquad (1)$$

where W1 represents a load of the compression spring 35, $\mu 1$ represents a friction coefficient between the conical projection 30*b* of the blade locking pin 30 and the tapered cylindrical surface 28*d* of the first blade holder 28, and $\theta 2$ represents an angle between the tapered cylindrical surface 28*d* and the axis 20*j* of the plunger 20.

Thus, according to the present invention, the load W1 of the compression spring 35 can be boosted by reducing the angle $\theta 2$ of the tapered cylindrical surface 28*d*. The boosted load is converted into the pressing force F1 of the blade locking pin 30.

③ To remove the blade 27 from the condition shown in FIG. 23, the user rotates the first blade holder 28. The first blade holder 28 shifts rearward (retracts in the axial direction) against the resilient force of the compression spring 35, while the steel ball 32 rolls in the helical groove 20*g* of the plunger 20.

In this case, the relationship between a rotational torque T1 given from the user and a compression load W2 of the compression spring 35 can be defined by the following equation.

$$W2 = T1(1 - \mu 2 \tan \theta 1)/r \cdot (\mu 2 + \tan \theta 1) \qquad (2)$$

where $\mu 2$ represents a friction coefficient between the helical groove 20*g* of the plunger 20 and the steel ball 32 and also the thrust bearing 37, $\theta 1$ represents a lead angle of the helical groove 20*g* of the plunger 20, and r represents a radius of the outer sleeve 28*b* of the first blade holder 28.

The friction coefficient $\mu 2$ is a rolling friction and therefore can be neglected. Thus, the equation (2) can be rewritten into the following equation.

$$W2 = T1/r \cdot \tan \theta 1 \qquad (3)$$

Thus, according to the present invention, the rotational force given from the user can be boosted by reducing the lead angle $\theta 1$ of the helical groove 20*g*. The boosted force is used to push the first blade holder 28 in the axial direction. Thus, it becomes possible to easily retract the first blade holder 28 rearward against the compression load W2 of the compression spring 35.

The above-described embodiment functions in the following manner and brings the following effects.

The blade locking pin 30 is provided for locking and unlocking the blade 27. The blade locking pin 30 is shiftable in the radial direction. The first blade holder 28 has the tapered cylindrical surface 28*d* at its front end. The tapered cylindrical surface 28*d* regulates the radial position of the blade locking pin 30. The first blade holder 28 is shiftable in the axial direction in accordance with the rolling motion of the steel ball 32 in the helical groove 20*g*. The radial shift position of the blade locking pin 30 varies in accordance with the change of the contact point between the conical projection 30*b* of the blade locking pin 30 and the tapered cylindrical surface 28*d* of the first blade holder 28. The blade locking pin 30 is thus allowed to move in the radial direction along the slope defined by the tapered cylindrical surface 28*d* of the first blade holder 28.

The compression spring 35, provided around the plunger 20, resiliently pushes the first blade holder 28 forward so that the blade 27 can be securely fixed. The blade 27 is detachable by shifting the first blade holder 28 rearward against the resilient force of the compression spring 35. Thus, the present invention allows the user to easily perform the attaching and detaching operation of the blade 27 without using the wrench or other tools.

The blade locking pin 30 applies the pressing force F1 to the side surface of the proximal end 27*a* of the blade 27 when the blade 27 is placed in the slit 20*d* of the plunger 20. Thus, the present invention effectively suppresses the lateral vibration of the blade 27.

The blade locking pin 30 is disposed in the stepped bore 20*e* of the plunger 20. The compression spring 31 resiliently urges the blade locking pin 30 in the radially outward direction. The conical projection 30*b* of the blade locking pin 30 is brought into contact with the tapered cylindrical surface 28*d* of the first blade holder 28. The radial position of the blade locking pin 30 is regulated by the slide motion of the first blade holder 28. Thus, the engagement and disengagement between the blade locking pin 30 and the blade 27 can be easily and automatically performed by rotating the first blade holder 28.

When the user inclines the saber saw so as to direct the front end of the plunger 20 downward, a broken piece of the blade 27 or the blade 27 itself can be easily removed off the slit 20*d* due to its gravity. Thus, it becomes possible to provide a blade attaching and detaching mechanism which is excellent in operability.

The perpendicularly arranged groove 20*h* is formed at the rear end of the helical groove 20*g*. This makes it possible to lock the axial position of the first blade holder 28 with respect to the plunger 20. When the steel ball 32 is placed in the perpendicularly arranged groove 20*h*, the first blade holder 28 is locked in the blade attachable condition. This allows the user to perform a single-hand operation for inserting the blade 27 into the slit 20*d*.

Only the blade holders 28 and 29 and the compression spring 35 are the components exposed outside the saber saw body and are all configured into cylindrical shape. It becomes possible to prevent the blade attaching and detaching mechanism from being damaged by a cut or sawed piece. The durability of the saber saw is increased.

From the retracted condition shown in FIG. 1, the user can operate the switch 4 to protrude the first blade holder 28 in the axial direction out of the saber saw body. When the blade 27 is positioned forward than the condition shown in FIG. 1, the user can grip the first blade holder 28 and manually pull it out of the saber saw body. The attaching and detaching operation can be easily performed.

As explained in the foregoing description, according to the present invention, the attaching and detaching operation of the blade can be easily performed by simply sliding the first blade holder. The attaching and detaching work can be simplified. The number of the parts or components exposing out of the saber saw body can be minimized. It becomes possible to prevent the blade attaching and detaching mechanism from being damaged by a cut or sawed piece. The durability of the saber saw is increased.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A blade attaching and detaching mechanism for a saber saw comprising a plunger for holding a rear end of a blade and reciprocating the blade to perform a cutting or sawing operation, said blade attaching and detaching mechanism comprising:

a slit formed in said plunger so as to extend in an axial direction of said plunger;

a bore formed in said plunger so as to extend in a direction normal to the axial direction of said plunger and merge with said slit;

a locking pin extending in a direction normal to the axial direction of said plunger and disposed in said bore so as to be slidable in said bore, said locking pin comprising a projecting portion engageable with a hole formed on said blade and a pressing portion having an engaging surface parallel to said blade for pressing a side surface of said blade to an opposed wall of said slit so as to substantially prevent movement of said blade in relation to said opposed slit wall; and a blade holder coupled around said plunger and slidable in the axial direction of said plunger, wherein said blade holder shifts in an axially forward direction to generate a pushing force applied to said locking pin and causes the locking pin to engage with the hole of the blade, and said blade holder shifts in an axially rearward direction to release the pushing force applied to said locking pin and causes the locking pin to disengage from the hole of the blade.

2. A blade attaching and detaching mechanism for a saber saw comprising a plunger for holding a rear end of a blade and reciprocating the blade to perform a cutting or sawing operation, said blade attaching and detaching mechanism comprising:

a slit formed in said plunger so as to extend in an axial direction of said plunger;

a bore formed in said plunger so as to extend in a direction normal to the axial direction of said plunger and merge with said slit;

a locking pin disposed in said bore so as to be slidable in said bore, said locking pin comprising a projecting portion engageable with a hole formed on said blade and a surface for pressing a side surface of said blade to a wall of said slit; and a blade holder coupled around said plunger and slidable in the axial direction of said plunger, wherein said blade holder shifts in an axially forward direction to generate a pushing force applied to said locking pin and causes the locking pin to engage with the hole of the blade, said blade holder shifts in an axially rearward direction to release the pushing force applied to said locking pin and causes the locking pin to disengage from the hole of the blade, and an additional blade holder is provided for slidably holding said blade holder so as to prevent said locking pin from being pulled out of said bore when said blade holder shifts in the axially rearward direction.

3. The blade attaching and detaching mechanism in accordance with claim 1, wherein said blade holder has a tapered cylindrical surface expanding in the axially forward direction, said tapered cylindrical surface is brought into contact with said locking pin so as to regulate a shifting position of said locking pin, and a contact point between said tapered cylindrical surface and said locking pin changes in accordance with an axial movement of said blade holder, thereby varying the pushing force applied to said locking pin.

4. A blade attaching and detaching mechanism for a saber saw comprising a plunger for holding a rear end of a blade and reciprocating the blade to perform a cutting or sawing operation, said blade attaching and detaching mechanism comprising:

a slit formed in said plunger so as to extend in an axial direction of said plunger;

a bore formed in said plunger so as to extend in a direction normal to the axial direction of said plunger and merge with said slit;

a locking pin disposed in said bore so as to be slidable in said bore, said locking pin comprising a projecting portion engageable with a hole formed on said blade and a surface for pressing a side surface of said blade to a wall of said slit; and a blade holder coupled around said plunger and slidable in the axial direction of said plunger, wherein said blade holder shifts in an axially forward direction to generate a pushing force applied to said locking pin and causes the locking pin to engage with the hole of the blade, said blade holder shifts in an axially rearward direction to release the pushing force applied to said locking pin and causes the locking pin to disengage from the hole of the blade, and a resilient member is provided for resiliently urging said blade holder in the axially forward direction.

5. The blade attaching and detaching mechanism in accordance with claim 4, wherein a helical groove is provided on an outer surface of said plunger, said helical groove having a predetermined inclined angle with respect to an axis of said plunger, and an engaging member is disposed in said helical groove so as to roll in said helical groove when said blade holder rotates, thereby allowing said blade holder to shift in the axial direction of the plunger.

6. The blade attaching and detaching mechanism in accordance with claim 5, wherein an additional groove is continuously formed with said helical groove, and said additional groove is arranged perpendicular to the axis of said plunger.

7. A blade attaching and detaching mechanism for a saber saw comprising a plunger for holding a rear end of a blade and reciprocating the blade to perform a cutting or sawing operation, said blade attaching and detaching mechanism comprising:

a slit formed in said plunger so as to extend in an axial direction of said plunger;

a bore formed in said plunger so as to extend in a direction normal to the axial direction of said plunger and merge with said slit;

a locking pin disposed in said bore so as to be slidable in said bore, said locking pin comprising a projecting portion engageable with a hole formed on said blade and a surface for pressing a side surface of said blade to a wall of said slit; and a blade holder coupled around said plunger and slidable in the axial direction of said plunger, wherein said blade holder shifts in an axially forward direction to generate a pushing force applied to said locking pin and causes the locking pin to engage with the hole of the blade, said blade holder shifts in an axially rearward direction to release the pushing force applied to said locking pin and causes the locking pin to disengage from the hole of the blade, and an urging member is provided in said bore of said plunger so as to urge said locking pin in a radially outward direction.

8. The blade attaching and detaching mechanism in accordance with claim 4, wherein a support member is interposed between said resilient member and said plunger.

9. The blade attaching and detaching mechanism in accordance with claim 2, wherein:

said blade holder has a tapered cylindrical surface expanding in the axially forward direction, said tapered cylindrical surface is brought into contact with said locking pin so as to regulate a shifting position of said locking pin, and a contact point between said tapered cylindrical surface and said locking pin changes in accordance with an axial movement of said blade holder, thereby varying the pushing force applied to said locking pin.

10. The blade attaching and detaching mechanism in accordance with claim 2, wherein a resilient member is provided for resiliently urging said blade holder in the axially forward direction.

11. The blade attaching and detaching mechanism in accordance with claim 10, wherein a helical groove is provided on an outer surface of said plunger said helical groove having a predetermined inclined angle with respect to an axis of said plunger, and an engaging member is disposed in said helical groove so as to roll in said helical groove when said blade holder rotates thereby allowing said blade holder to shift in the axial direction of the plunger.

12. The blade attaching and detaching mechanism in accordance with claim 11, wherein an additional groove is continuously formed with said helical groove, and said additional groove is arranged perpendicular to the axis of said plunger.

13. The blade attaching and detaching mechanism in accordance with claim 2, wherein an urging member is provided in said bore of said plunger so as to urge said locking pin in a radially outward direction.

14. The blade attaching and detaching mechanism in accordance with claim 4, wherein said blade holder has a tapered cylindrical surface expanding in the axially forward direction, said tapered cylindrical surface is brought into contact with said locking pin so as to regulate a shifting position of said locking pin, and a contact point between said tapered cylindrical surface and said locking pin changes in accordance with an axial movement of said blade holder, thereby varying the pushing force applied to said locking pin.

15. The blade attaching and detaching mechanism in accordance with claim 4, wherein an urging member is provided in said bore of said plunger so as to urge said locking pin in a radially outward direction.

16. A blade attaching and detaching mechanism for a saber saw comprising a plunger for holding a rear end of a blade and reciprocating the blade to perform a cutting or sawing operation, said blade attaching and detaching mechanism comprising:

a slit formed in said plunger so as to extend in an axial direction of said plunger;

a bore formed in said plunger so as to extend in a direction normal to the axial direction of said plunger and merge with said slit;

a helical groove provided on an outer surface of said plunger, said helical groove having a predetermined inclined angle with respect to an axis of said plunger;

an additional grove continuously formed with said helical groove, said additional groove being arranged perpendicular to said axis of said plunger;

a locking pin slidably disposed in said bore for pressing a side surface of said blade to an opposed wall of said slit so as to substantially prevent movement of said blade in relation to said opposed slit wall;

a blade holder coupled around said plunger and slidable in the axial direction of said plunger; and a resilient member provided for resiliently urging said blade holder in the axially forward direction.

17. A blade attaching and detaching mechanism for a saber saw comprising a plunger for holding a rear end of a blade and reciprocating the blade to perform a cutting or sawing operation, said blade attaching and detaching mechanism comprising:

a slit formed in said plunger so as to extend in an axial direction of said plunger;

a stepped bore formed in said plunger so as to extend in a direction normal to the axial direction of said plunger and merge with said slit, said bore coaxially extending at least partially through said plunger on both sides of said slit;

a locking pin disposed in a larger diameter portion of said bore so as to be slidable in said bore, said locking pin comprising a projecting portion engageable with both a hole formed on said blade and with a smaller diameter portion of said stepped bore on the other side of said slit and said locking pin having a surface for pressing a side surface of said blade to a wall of said slit so as to substantially prevent movement of said blade in relation to said slit wall; and a blade holder coupled around said plunger and slidable in the axial direction of said plunger, wherein said blade holder shifts in an axially forward direction to generate a pushing force applied to said locking pin and causes the locking pin to engage with the hole of the blade, and said blade holder shifts in an axially rearward direction to release the pushing force applied to said locking pin and causes the locking pin to disengage from the hole of the blade.

* * * * *